March 15, 1960 T. L. A. M. STEENHUIS 2,928,173
PRINT MOLDER FOR PLASTIC MATERIALS Filed May 6, 1957 2 Sheets-Sheet 1

INVENTOR
THEODOR LUDWIG AUGUST MARIA STEENHUIS
BY
HIS ATTORNEYS

March 15, 1960  T. L. A. M. STEENHUIS  2,928,173
PRINT MOLDER FOR PLASTIC MATERIALS
Filed May 6, 1957  2 Sheets-Sheet 2

INVENTOR
THEODOR LUDWIG AUGUST MARIA STEENHUIS
BY
Brumbaugh, Free, Graves & Donohue
HIS ATTORNEYS

United States Patent Office 2,928,173
Patented Mar. 15, 1960

2,928,173

PRINT MOLDER FOR PLASTIC MATERIALS

Theodor Ludwig August Maria Steenhuis, Kleve, Germany, assignor to Lever Brothers Company, New York, N.Y., a corporation of Maine Application May 6, 1957, Serial No. 657,193

Claims priority, application Germany May 8, 1956

9 Claims. (Cl. 31—42)

The invention relates to processes and devices for the measuring off and shaping of viscous and soft plastic materials, such as margarine, butter, etc.

In the manufacture of viscous materials, particularly margarine or butter, by continuous processes, where crystallization of the oils occurs only at the discharge point of the measuring-off device, the latter is usually equipped with an outlet mouthpiece. A construction of this kind has the particular disadvantage that if the mouthpiece is fixed vertically in relation to the measuring-off device part of the measured quantity may come out by force of gravity, with the result that when the desired quantity of the viscous or soft plastic materials is separated off by means of a cutting device there may be considerable differences in weight between the separated pieces.

Measuring-off devices for viscous and plastic materials are known which are equipped with a revolving mold in which a movable measuring-off piston is fitted vertically in relation to its axis of rotation. When the piston is moved in one direction a certain quantity of the material enters the empty space above it; by turning the mold a measured quantity of the material is then separated off from the mass in the inlet mouthpiece of the device. In the discharge position the piston is moved in the opposite direction in order to force the individual measured-off quantity out of the mold and at the same time take up another lot of the plastic material from the other side into the empty space created inside the mold by the movement of the piston.

It is further known to control the movement of the piston within the revolving mold in such a way that the ends of the piston are flush with the periphery of the revolving mold in the extreme positions. It is also known in a device of this kind not to continue the piston movement as far as the periphery of the mold, that is to say to allow the movement of the piston to end shortly before, so that a small quantity remains in the mold when the individual measured-off quantity is forced out.

The main purpose of the present invention is to provide a process and a device for measuring-off soft and viscous plastic materials, for example margarine and butter, which will reduce the differences in weight between the individual measured-off quantities as compared with those occurring with the known devices.

A further purpose of the invention is to create a process and a device for measuring-off in the manner already described by means of which the quantity to be measured-off can be accurately adjusted by simple means.

The invention is furthermore intended to provide a measuring-off device which is simple and reliable in construction, so that it can be operated by staff who have had little training.

The invention is moreover adapted to a new method of separating the measured-off material, which employs separating devices that are known in themselves but which drastically reduces the tolerances or weight fluctuations even if the measured-off quantity is forced out through an outlet mouthpiece. The invention is designed to ensure that there is no subsequent undesired discharge of the viscous mass from the mouthpiece by force of gravity.

According to the invention, it is suggested that for the measuring-off and shaping of viscous and soft plastic materials such as margarine, butter, etc., using a mold revolving in a casing and having a piston that can be moved backwards and forwards in the mold, the piston should be made in at least two parts. In the discharge position one part can be pushed beyond the edge of the revolving mold and brought back again to the periphery after the discharge stroke is completed and before the measuring-off chamber starts to rotate.

For this purpose, and in accordance with a preferred embodiment of the invention, the piston can consist of two interconnected parts which, by means of a control device, can be moved from a position where they are in contact with each other to one where they are at a distance from each other, in which latter case the part of the piston facing the discharge side protrudes beyond the periphery of the mold. The extent to which the piston part protrudes, or the extent of its movement, is adjustable according to the invention.

It is further possible within the framework of the invention to adjust the displacement of the piston or of the piston parts as a whole while the device is in action, in order to achieve the desired adjustment when measuring-off desired molded pieces which may show certain specific weight differences.

According to one embodiment of the invention, a piston regulating or adjusting device of this kind can be provided by having conical stop faces on the piston parts which work in conjunction with a conical regulating part lying preferably in the axis of rotation of the mold, the regulating movement of which in the direction of the axis of rotation of the mold determines the momentum of the piston or of the piston parts.

According to another embodiment of the invention, it is possible to connect the piston parts in such a way that there is always a force trying to press the piston parts into the mutual contact position. For example, a spring may be provided for this purpose, each of the two ends of which rests against one piston part.

According to one embodiment of the invention, a pendulum control can be provided for moving the piston or the piston parts to one or other of the extreme positions, which, apart from causing the piston parts to move within the bore of the mold, also causes one of the piston parts to move beyond the periphery of the revolving mold and, in conjunction with the force of the interposed spring, takes it back again inside the periphery.

For this purpose, there can be supported in a part of the casing revolving with the mold a rocking lever which at one point is connected with a control push rod resting movably in the casing and at another point can engage either of the piston parts. In order to provide smooth and efficient operation each piston part can be provided with a roller guide working in conjunction with the rocking lever. According to the invention the construction is preferably such that on termination of the joint movement of the piston parts within the mold one of the piston parts is arrested by the adjusting device, while against the force of a spring pressing the two piston parts towards the mutual contact position, the rocking lever presses on the other piston part in order to allow it to protrude beyond the edge of the revolving mold at the material discharge position. After a quantity of the measured material has been separated off the pressure of the lever is terminated and the spring retracts the piston part within the periphery of the casing part before the next phase of movement of the revolving casing part begins.

Any suitable control device may be used to control the piston in conjunction with the control push rod. In a preferred embodiment of the invention, there can be provided a steering arm swivelling round a fixed point, preferably a bolt, and having a curved track, which engages with the push rod to move the piston or piston parts backwards and forwards alternately.

According to the invention it is furthermore suggested that when plastic materials such as solid margarine or butter are being dealt with a device for separating off the measured quantity of plastic material, such as margarine, butter, etc., should work in direct conjunction with the piston surface protruding from the mold; for this purpose any known separating device, for example a cutting wire, a cutting knife, or the like, can be provided.

An embodiment of the invention is illustrated in the attached drawings by way of example.

Figure 5:
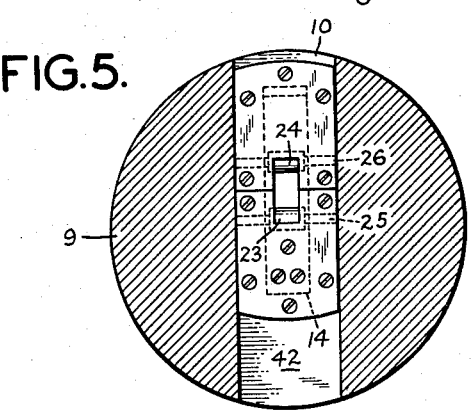
Figures 3, 4:
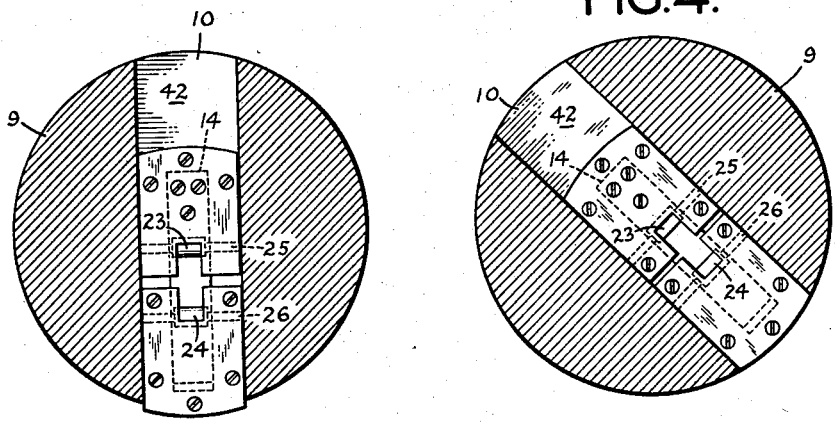
Fig. 3 shows a reduced section along the line 3—3 in Fig. 1, the measuring-off piston being shown in the discharge position.

Fig. 4 is a view similar to that in Fig. 3, in which the mold and retracted piston part are shown in one position during the revolving process, i.e. an intermediate position between the inlet position and the discharge position; and Fig. 5 is a view similar to that in Fig. 3, in which the mold and the measuring-off piston are shown in their positions before the start of the measuring-off process and before the discharge movement of the measuring-off piston begins.

Figure 1:
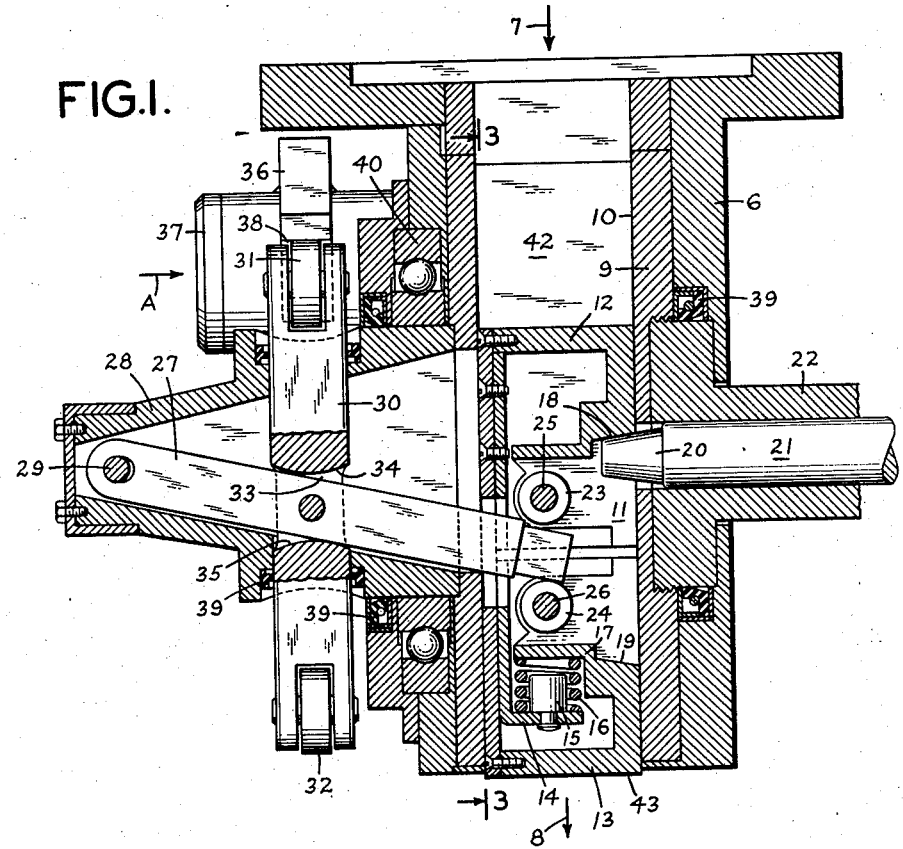
Fig. 1 shows a longitudinal section through the mold and the parts associated with it.
Figure 2:
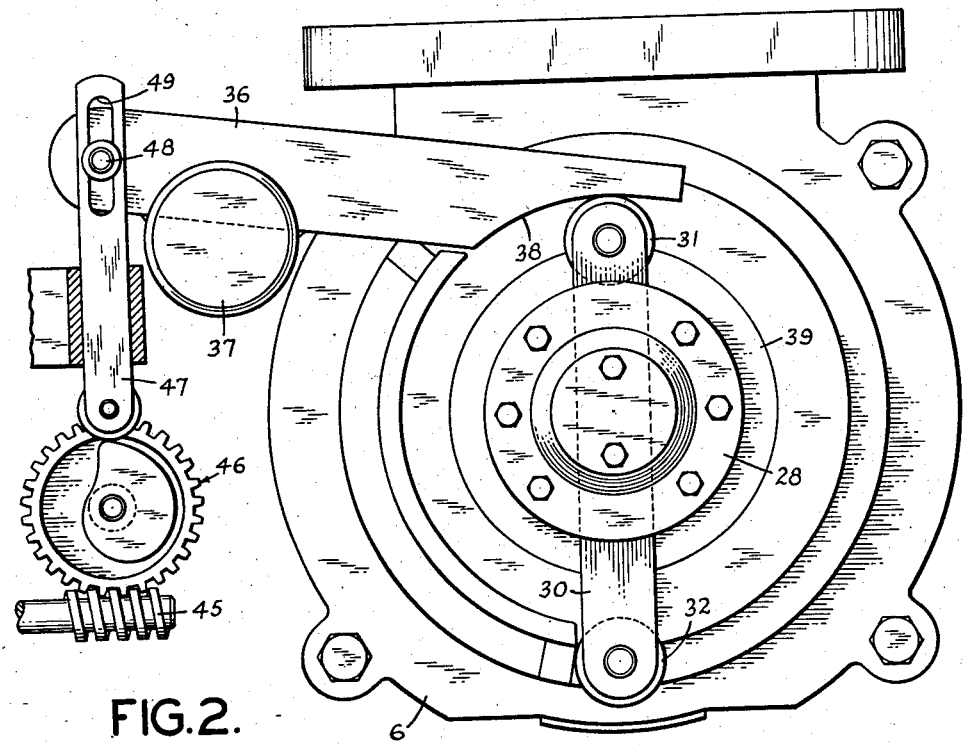
Fig. 2 is a side view of Fig. 1 as seen in the direction of the arrow A.

Referring to Figs. 1 and 2, a revolving mold 9 rests in a stationary casing 6, which has an inlet point 7 and a discharge point 8. Within the mold 9, which has a bore 10, there is a movable measuring-off piston 11 consisting of two parts 12 and 13, which are jointly movable in a manner to be described later on. The piston part 12 is provided with an angular butt strap 14, the end of which forms a support 15 for a spring 16, which is supported at the other end by an extension 17 of the piston part 13.

The piston parts 12 and 13 are provided with conical thrust surfaces 18 and 19, working in conjunction with a conical attachment 20 of an adjusting axle 21, which is movable in the direction of the axis of rotation of the mold 9 by known means. The extent of the backwards and forwards movement of the piston parts 12 and 13 within the bore 10 of the mold 9 is determined by the greater or lesser movement of the adjusting axle 21, and hence of the conical attachment 20.

Inside the piston parts 12 and 13, there are guides, such as the rollers 23 and 24 resting on the axles 25 and 26, which can work in conjunction with a control lever 27 of a pendulum control. This control lever 27 pivots at 29 on an attachment 28 of the revolving mold 9 and works in conjunction with a control push rod 30, which carries rollers 31 and 32 at its ends.

The control push rod 30 may be provided with a slit 33 through which the control lever 27 passes; the control push rod 30 is provided with suitable guide tracks 34 and 35.

The control push rod 30 works in conjunction with a control arm 36, driven by any suitable means, which can be pivoted at 37 around a pivot bearing, for example a bolt, and which has a curved track 38 at its end which works in conjunction with the rollers 31 and 32 of the control push rod 30 alternately.

In order to prevent any of the material to be measured-off coming out of the mold, there may be incorporated between the rotating and the stationary parts of the apparatus known types of ring packing, two of which are indicated at 39. For purposes of easy rotation of the mold 9 in the stationary casing 6 suitable bearings, for example, the roller bearings 40, may be provided.

The drive for the revolving mold 9 may be suitably derived from an electric motor (not shown), the rotary movements of which are transmitted to a main driving shaft which in turn, via further connections, intermittently turns the drive shaft 22 and the mold 9 through 180°. Furthermore, in order to prevent any undesired revolutions of the mold 9 in the extreme positions, a special stopping device (not shown) may be provided which is released automatically whenever a further rotation of the mold 9 is desired.

The movement for the piston parts 12 and 13 can be derived in conjunction with the rotation of the mold 9 from the main driving shaft, and for this purpose a worm drive 45 can be provided which via a cam gear 46 actuates a push rod 47 which in turn operates the control arm 36 by means of a pin 48 and an adjusting slit 49.

A device according to the invention works in the following manner: The starting point is the position shown in Fig. 1, in which the piston 11 has delivered a measured part quantity at the discharge point 8 (see the position in Fig. 3), after which the piston part 13 returns before the mold 9 starts to rotate, to a position flush with the periphery of the mold 9, as shown in Fig. 4. In this position, the mold 9 in conjunction with the parts described above is turned via the driving device previously described but not illustrated and by the driving shaft 22 until the piston is in the position shown in Fig. 5, where it is ready to take up a fresh quantity for measuring-off and to discharge the already measured-off quantity 42 (Fig. 5). The taking-up movement of the piston 11 from the position shown in Fig. 5 to the final position according to Fig. 3 is limited by the contact of the conical surface 18 or 19 of the piston part 12 or 13 with the conical attachment 20 of the adjusting device 21. The movement of the piston 11 from the position shown in Fig. 5 to the position shown in Fig. 3, in which the surface of the piston parts 12 and 13 at first protrudes beyond the surface line of the mold 9 in the direction of the outlet aperture and then lies flush with it (Fig. 4), is effected by pivoting the lever 36 round the fulcrum 37, which lever, by means of the curved track 38, presses the push rod 30 into the position shown in Fig. 1, the piston parts 12 and 13 moving jointly to begin with, and a given quantity of the material to be measured-off 42, entering the cavity of the mold 9. The material can be introduced into the cavity by auxiliary means, for example pressure, force of gravity, etc., or simply by the suction effect of the piston 11. It is not essential for the piston to be in the vertical position shown in Fig. 1 for vertical filling downwards; the device can be used just as advantageously for measuring-off and filling in a horizontal direction or any desired oblique direction.

After the piston parts 12 and 13 have moved downwards as a result of the action of the push rod 30 and have thus measured-off a given quantity of material 42, the movement of the piston parts 12 or 13 stops as a result of the conical sliding surface 18 or 19 of the piston part 12 or 13 coming into contact with the conical attachment 20. As a result of the fact that during the downward movement of the driven piston part 12 or 13 the two piston parts are kept pressed together via the angular butt strap 14 by the spring 16, both parts must of necessity move along together until the conical surface 18 or 19 comes into contact with the conical attachment 20. At that moment the piston surface 43 of the piston part 13, for example, opposite the discharge aperture 8 (Fig. 1), has not yet reached the surface line of the mold 9. When the conical surface 18 or 19 comes into contact with the conical attachment 20 the movement of the control lever 27 is not yet completed. On the contrary, the control lever 27 continues its movement, thus continuing to press on the roller 23 or 24 and consequently on the piston part 12 or 13, which, against the force of the spring 16, is moved downwards to protrude out of the mold 9 to a given extent, as indicated in Fig. 3. The measured or shaped quantity is then separated off by means of a separating knife (not shown) or a separating wire, either at the edge of a discharge mouthpiece not described in detail or from the end surface 43 of the piston part 12 or 13, depending on which part of the piston happens to be at the discharge aperture 8.

As the final position of the control lever 27, and consequently also of the particular piston surface of the piston parts 12 and 13 can be fixed precisely by the position of the pin 48 in the slot 49 and is always the same, it is possible in practice to achieve separation of the measured-off material directly from the piston surface 43, or the quantity of material emerging from a subsequent mouthpiece corresponds exactly to the measured-off quantity 42. In the latter case, as a result of the backward movement of the piston part 12 or 13 to the surface line of the mold 9 immediately following separation, the material remaining in the mouthpiece tube is sucked back, thus preventing any subsequent undesired emergence owing to the force of gravity.

Before the revolving motion of the mold 9 starts again the control lever 27 is retracted a little from the final position shown in Fig. 1, thus relaxing the pressure on the spring 16, so that the surface 43 of the piston part 13 moves back again to the surface line of the mold 9. The mold, with the parts connected with it (see Fig. 4), is then turned until it reaches the final position shown in Fig. 5, when the above-mentioned process is repeated.

Apart from the advantages already described, namely, the discharge of exact weights and a stricter adherence to the quantity to be measured-off, the device according to the invention has the further advantage of preventing any air pockets from forming at the piston surface, as the bore of the mold is for all practical purposes always completely filled during the revolving movement of the latter on account of the rolling of the control push rod rollers 31 on the curved track 38 of the control lever 36.

In the event of fluctuations in the specific gravity of the materials to be measured-off, very fine adjustment can be achieved at any time during the process by simply regulating the adjusting axle 21, which accurately regulates the course of the piston or the piston parts within the mold.

The whole device can be constructed so as to be easily dismantled and therefore easy to clean.

A device according to the invention can be combined in a known manner with a receiving device, for example a packing machine, which packs the individual quantities or individual pieces of viscous or plastic material measured-off in the manner described above.

A device according to the invention can also be directly coupled, say, with a machine for producing the above-mentioned materials, e.g. butter, or margarine, the pressure of the producing machine being used to convey the material into the measuring-off device.

Although the invention has been described with reference to a specific embodiment, many modifications will readily occur to those skilled in the art. Accordingly, the scope of the invention is not to be limited except as defined by the following claims.

I claim:

1. Apparatus for delivering exact volumes of viscous material comprising a rotatably mounted mold having an aperture substantially perpendicular to the axis of rotation of the mold adapted to be aligned with diametrically opposed entrance and exit openings a divided piston movable as a unit with the aperture said piston having at least two parts capable of independent motion with respect to each other, a central piston stop adapted to engage either of the piston parts to limit the motion thereof in a direction toward the axis of rotation, and piston actuating means engageable with either one of the piston parts to move the piston as a unit in the aperture and adapted to drive said one piston part away from the other piston part when the other piston part is held stationary.

2. Apparatus according to claim 1 wherein the piston stop is provided with an axially movable conical surface adapted to engage complementary surfaces on the piston parts.

3. Apparatus according to claim 1 including means for urging the two piston parts together.

4. Apparatus according to claim 1 wherein the piston actuating means includes lever means mounted to rotate with the mold and adapted to engage either of the two piston parts to move it away from the other.

5. Apparatus according to claim 4 including a control push rod operatively connected to the lever means.

6. Apparatus according to claim 5 wherein the ends of the push rod are provided with rollers.

7. Apparatus according to claim 6 including a pivotally mounted arm having a curved track adapted to engage the ends of the push rod to alternately move the piston back and forth within the aperture.

8. Apparatus according to claim 7 including means for actuating the pivotally mounted arm in conjunction with the rotation of the mold whereby the piston is operated to eject a measured volume of material when the aperture is aligned with the exit opening.

9. Apparatus according to claim 8 wherein the means for actuating the pivotally mounted arm includes a rotating cam and a push rod operated thereby and adjustably connected to the arm.

References Cited in the file of this patent

UNITED STATES PATENTS

| | | |
|---|---|---|
| 636,839 | Pecht | Nov. 14, 1899 |
| 1,416,987 | Sharpe | May 23, 1922 |
| 1,545,513 | Peters et al. | July 14, 1925 |
| 2,010,524 | McClatchie | Aug. 6, 1935 |
| 2,666,229 | Vogt | Jan. 19, 1954 |
| 2,683,932 | Steenhuis | July 20, 1954 |
| 2,708,287 | Long et al. | May 17, 1955 |

UNITED STATES PATENT OFFICE

CERTIFICATE OF CORRECTION

Patent No. 2,928,173            March 15, 1960

Theodor Ludwig August Maria Steenhuis

It is hereby certified that error appears in the printed specification of the above numbered patent requiring correction and that the said Letters Patent should read as corrected below.

Column 6, line 11, for "with" read -- within --.

Signed and sealed this 20th day of September 1960.

(SEAL)
Attest:

KARL H. AXLINE            ROBERT C. WATSON
Attesting Officer            Commissioner of Patents